May 29, 1956  J. W. BOECKEL  2,748,302
BRUSH HOLDER ASSEMBLY FOR DYNAMO-ELECTRIC MACHINE
Filed June 11, 1953
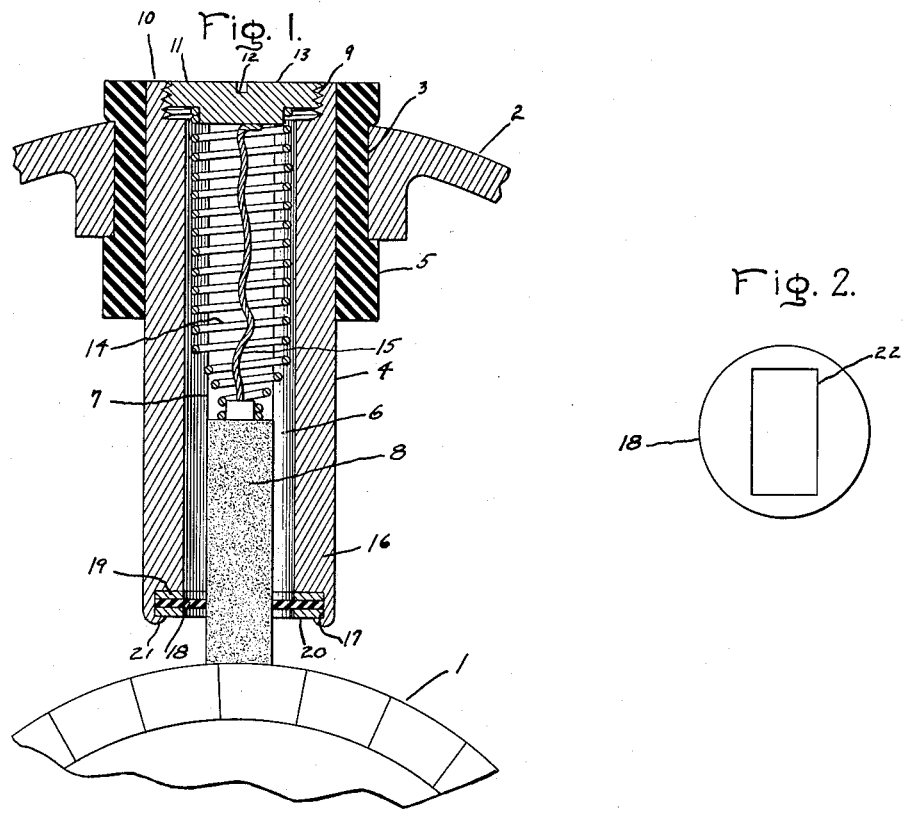
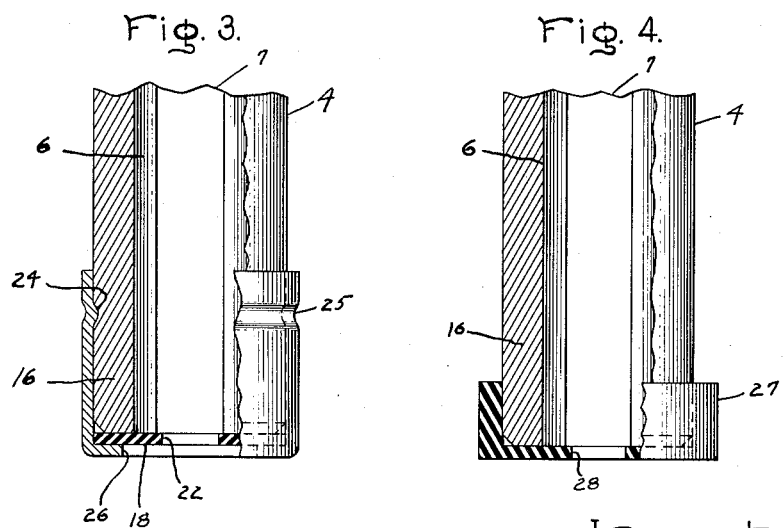
Inventor:
John W. Boeckel,
by *Robert E. Iris*
His Attorney.

United States Patent Office 2,748,302
Patented May 29, 1956

2,748,302

BRUSH HOLDER ASSEMBLY FOR DYNAMO-ELECTRIC MACHINE

John W. Boeckel, Fort Wayne, Ind., assignor to General Electric Company, a corporation of New York Application June 11, 1953, Serial No. 360,945

7 Claims. (Cl. 310—247)

This invention relates to brush holder assemblies for dynamoelectric machines and more particularly to brush holder assemblies of the cartridge type.

In the design of certain small dynamoelectric machines, for example direct current motors and generators in the fractional horsepower frame sizes, cartridge type brush holders are frequently used to guide the contact brushes against the surface of the commutator or other current collector member. A cartridge type brush holder conventionally includes a substantially tubular member having a longitudinally extending opening formed therethrough. The contact brush is positioned in the longitudinal opening of the brush holder tube and guided thereby toward the current collector member. A coil spring is usually arranged in the longitudinal opening of the tube and serves resiliently to bias the brush against the current collector member. The brush holder tube is mounted in a suitable opening in a frame member of the machine and may be insulated therefrom.

In the past, difficulty has been experienced with particles of dirt lodging in the brush holder tubes of open type dynamoelectric machines having cartridge type brush holders and thus causing the brushes to stick. This condition has been especially serious in certain installations, such as railroad rolling stock equipment where a large quantity of dust is thrown up from the road bed due to the motion of the train. Numerous arrangements have been tried to alleviate this brush sticking; however, most of these arrangements were complicated and added appreciably to the overall cost of the equipment and none has been found to be entirely satisfactory. It is therefore desirable to provide a brush holder assembly of the cartridge type incorporating simple and inexpensive means for effectively stopping the entrance of particles of dirt into the brush holder tube.

It is therefore an object of this invention to provide an improved brush holder assembly incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a brush holder tube member is provided having a longitudinal opening formed therethrough for guiding a contact brush toward a current collector member. A dust stopping member is secured to the end of the brush holder tube adjacent the current collector member and has an opening formed therein adapted to slidingly receive the contact brush thereby preventing entrance of dirt into the brush holder tube member opening. This dust stopping member is preferably formed of resilient material, such as silicone rubber, thus permitting an interference fit with the brush which nevertheless is not detrimental to the normal sliding motion of the brush.

In the drawing,

Fig. 1 is a side elevational view, partly in section, illustrating the preferred form of the improved brush holder assembly of this invention;

Fig. 2 illustrates the dust stopping member of Fig. 1;

Fig. 3 is a fragmentary view, partly in section, illustrating a modified form of this invention; and Fig. 4 is another fragmentary view, partly in section, illustrating another modified form of this invention.

Referring now to Figs. 1 and 2, there is shown a portion of a small commutator-type dynamoelectric machine having a commutator 1 and a frame member 2 with an opening 3 formed therein. A brush holder tube member 4, formed of suitable conductive material, is positioned in the opening 3 of frame 2 and it is secured thereto by a sleeve 5 formed of suitable resilient insulating material, such as rubber or neoprene.

Brush holder tube member 4 has a longitudinal opening 6 formed therethrough with suitable grooves 7 formed in the wall thereof. A contact brush 8, formed of suitable material such as carbon, is arranged in the opening 6 and is guided toward commutator 1 by the longitudinal grooves 7. Threads 9 are formed in the upper end 10 of brush holder tube 4 and a cap member 11 threadingly engages the threads 9 and closes the longitudinal opening 6. Cap member 11, which may also be formed of suitable conductive material, may have a screw driver slot 12 formed in its upper surface and preferably has a spring seat portion 13 formed on its inner surface. A coil spring 14 is arranged in the longitudinal opening 6 of brush holder tube member 4 with one end engaging the spring seat portion 13 of cap member 11 and its other end engaging the upper surface of contact brush 8 in order resiliently to urge the brush 8 against the surface of commutator 1. Brush 8 may be provided with a suitable pigtail 15 having its upper end secured to the cap member 11.

In order to prevent the entrance of particles of dirt into the longitudinal opening 6 of brush holder tube member 4 through its lower end 16, an annular recess 17 is formed in the lower end 16 of brush holder tube member 4. A dust stopping member 18, preferably formed of resilient material having lubricating properties, such as silicone rubber, is arranged in the recess 17 and held in place between an upper washer member 19 and lower washer member 20. The lower extremity of end 16 of brush holder tube 4 is crimped over in several locations, as at 21, to secure the dust stopping member 18 and the washers 19 and 20 in the recess 17. Dust stopping member 18 has a rectangular opening 22 formed therein having a slight interference fit with the contact brush 8. This interference fit prevents the entrance of particles of dirt into the longitudinal opening 6 of brush holder tube member 4 while not interfering with the longitudinal sliding action of the brush.

Referring now to Fig. 3 in which like elements are indicated by like reference numerals, here dust stopping member 18 is seated against the lower edge 16 of brush holder tube member 4 and is held in position by a suitable cup-shaped member 23 arranged over dust stopping member 18 and lower end 16 of brush holder tube member 4. A suitable annular groove 24 may be formed in the outer surface of brush holder tube member 4 adjacent its lower end 16 cooperating with an annular indentation 25 formed in the wall of cup-shaped member 23 in order firmly to secure the cup-shaped member 23 to the brush holder tube member 4. Cup-shaped member 23 has an enlarged opening 26 formed therein to accommodate contact brush 8.

Referring now to Fig. 4 in which like elements are again indicated by like reference numerals, here, a cup-shaped dust stopping member 27 is provided arranged over the lower end 16 of brush holder tube member 4. Cup-shaped dust stopping member 27, in common with the dust stopping member 18 of Figs. 1, 2, and 3, is preferably formed of suitable resilient material having lubricating properties, such as silicone rubber, and has a rectangular opening 28 formed in its bottom portion adapted to slidingly receive the brush 3 thereby preventing entrance of dirt into the longitudinal opening 6 of the brush holder tube member 4. Dust stopping member 27 may be retained on the lower end 16 of brush holder tube member 4 by its own resilience or may be additionally secured thereto by the application of a suitable cement.

It will be readily apparent that this invention provides an improved brush holder assembly incorporating a simple, inexpensive and readily assembled arrangement for preventing the entrance of particles of dirt into the brush holder tube.

While I have illustrated and described particular embodiments of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. A brush holder assembly for a dynamoelectric machine comprising a brush holder tube member having a longitudinal opening formed therethrough for guiding a contact brush toward a current collector member, and a dust stopping member formed of resilient material and secured to said brush holder tube member adjacent its current collector end, said dust stopping member having an opening formed therein adapted to receive said contact brush slidingly and with a slight interference fit thereby preventing entrance of dirt into said brush holder tube member opening.

2. A brush holder assembly for a dynamoelectric machine comprising a brush holder tube member having a longitudinal opening formed therethrough for guiding a contact brush toward a current collector member, said brush holder tube member having a recess formed in its current collector end, and a dust stopping member formed of resilient material and seated in said brush holder tube member recess, said dust stopping member having an opening formed therein adapted to receive said contact brush slidingly and with a slight interference fit thereby preventing entrance of dirt into said brush holder tube member opening.

3. A brush holder assembly for a dynamoelectric machine comprising a brush holder tube member having a longitudinal opening formed therethrough for guiding a contact brush toward a current collector member, said brush holder tube member having a recess formed in its current collector end, a dust stopping member formed of resilient material seated in said brush holder tube member recess, said dust stopping member having an opening formed therein adapted to receive said contact brush slidingly and with a slight interference fit thereby preventing entrance of dirt into said brush holder tube member opening, and means for securing said dust stopping member in said brush holder tube member recess.

4. A brush holder assembly for a dynamoelectric machine comprising a brush holder tube member having a longitudinal opening formed therethrough for guiding a contact brush toward a current collector member, a dust stopping member formed of resilient material and seated against the current collector end of said brush holder tube member, said dust stopping member having an opening formed therein adapted to receive said contact brush slidingly and with a slight interference fit thereby preventing entrance of dirt into said brush holder tube member opening, and means for securing said dust stopping member to said brush holder tube member.

5. A brush holder assembly for a dynamoelectric machine comprising a brush holder tube member having a longitudinal opening formed therethrough for guiding a contact brush toward a current collector member, a dust stopping member formed of resilient material and seated against the current collector end of said brush holder tube member, said dust stopping member having an opening formed therein adapted to receive said contact brush slidingly and with a slight interference fit thereby preventing entrance of dirt into said brush holder tube member opening, and a cup-shaped member arranged over said brush holder tube member current collector end and securing said dust stopping member thereto, said cup-shaped member having an opening formed in its bottom portion for accommodating said contact brush.

6. A brush holder assembly for a dynamoelectric machine comprising a brush holder tube member having a longitudinal opening formed therethrough for guiding a contact brush toward a current collector member, said brush holder tube member having a circumferential groove formed in its outer surface adjacent its current collector end, a dust stopping member formed of resilient material seated against said brush holder tube member current collector end, said dust stopping member having an opening formed therein adapted slidingly to receive said contact brush thereby preventing entrance of dirt into said brush holder tube member opening, and a cup-shaped member arranged over said brush holder tube member current collector end and securing said dust stopping member thereto, said cup-shaped member having an opening formed in its bottom portion for accommodating said contact brush and an indentation formed in its wall cooperating with said brush holder tube member groove thereby to secure said cup-shaped member to said brush holder tube member.

7. A brush holder assembly for a dynamoelectric machine comprising a brush holder tube member having a longitudinal opening formed therethrough for guiding a contact brush toward a current collector member, and a cup-shaped dust stopping member formed of resilient material arranged over the current collector end of said brush holder tube member and having an opening formed therein adapted to receive said contact brush slidingly and with a slight interference fit thereby preventing entrance of dirt into said brush holder tube member opening.

References Cited in the file of this patent

UNITED STATES PATENTS

| 1,318,713 | Aalborg | Oct. 14, 1919 |
| 2,355,951 | Coffeen | Aug. 15, 1944 |

FOREIGN PATENTS

| 63,191 | Sweden | June 21, 1927 |
| 107,468 | Switzerland | Jan. 2, 1925 |
| 256,978 | Great Britain | Apr. 28, 1927 |
| 307,059 | Germany | Oct. 17, 1919 |